(12) United States Patent
Hodon et al.

(10) Patent No.: US 10,643,767 B2
(45) Date of Patent: May 5, 2020

(54) ELECTRICAL CABLE FOR AN APPLIANCE, APPLIANCE AND METHOD FOR PRODUCING AN ELECTRICAL CABLE

(71) Applicant: Bizlink Technology (Slovakia) s.r.o., Trencianska Teplá (SK)

(72) Inventors: Julius Hodon, Puchov (SK); Henrich Krump, Trencin (SK); Vladimir Kwapulinsky, Povazska Bystrica (SK); Juraj Melis, Trencin (SK); Jana Sisakova, Udica (SK); Martin Zboray, Trencin (SK)

(73) Assignee: BIZLINK TECHNOLOGY (SLOVAKIA) S.R.O., Trencianska Teplá (SK)

( * ) Notice: Subject to any disclaimer, the term of this patent is extended or adjusted under 35 U.S.C. 154(b) by 0 days.

(21) Appl. No.: 15/751,383

(22) PCT Filed: Aug. 26, 2015

(86) PCT No.: PCT/EP2015/069566
§ 371 (c)(1),
(2) Date: Feb. 8, 2018

(87) PCT Pub. No.: WO2017/032417
PCT Pub. Date: Mar. 2, 2017

(65) Prior Publication Data
US 2018/0240573 A1 Aug. 23, 2018

(51) Int. Cl.
*H01B 3/00* (2006.01)
*H01B 13/14* (2006.01)
(Continued)

(52) U.S. Cl.
CPC ............. *H01B 13/142* (2013.01); *A47L 9/26* (2013.01); *C09D 127/06* (2013.01); *H01B 7/28* (2013.01); *H01B 13/24* (2013.01)

(58) Field of Classification Search
CPC ......... H01B 3/00; H01B 7/0208; H01B 11/04
(Continued)

(56) References Cited

U.S. PATENT DOCUMENTS 3,902,937 A * 9/1975 Arndt ...................... B29C 70/66
156/315
5,113,039 A * 5/1992 Guipe .................. H01B 7/0009
156/247
(Continued)

FOREIGN PATENT DOCUMENTS

CA 2 058 715 A1 7/1992
CN 201 904 149 U 7/2011
(Continued)

OTHER PUBLICATIONS

International Search Report, PCT International Application No. PCT/EP2015/069566 dated Apr. 26, 2016.
(Continued)

*Primary Examiner* — Chau N Nguyen
(74) *Attorney, Agent, or Firm* — Millman IP Inc.

(57) ABSTRACT

The invention relates to an electrical cable (1) for an appliance, especially a vacuum cleaner. The cable (1) comprises a core bundle (21) comprising two core wires (10), each of the two core wires (10) comprising a center conductor (11) made of conductive strands and an insulation layer (13) on the outer periphery of the center conductor (11), the insulation layer (13) comprising a non-foamed softened polyvinyl chloride compound an inner sheath layer (14) arranged around the insulation layers (13), the inner sheath layer (14) comprising a foamed softened polyvinyl chloride compound wherein the foamed softened polyvinyl chloride compound of the inner sheath layer (14) contains a plurality of cells (16) and wherein each cell (16) is characterized by an equivalent diameter, in particular the diameter of a sphere having the same volume as the cell (16), an outer (Continued)

sheath layer (15) arranged around the inner sheath layer (14), the outer sheath layer (15) comprising a non-foamed, softened polyvinyl chloride compound. The invention further relates to an appliance with such a cable (1) as well as to an method of manufacturing the cable (1).

11 Claims, 5 Drawing Sheets

(51) Int. Cl.
*A47L 9/26* (2006.01)
*H01B 13/24* (2006.01)
*H01B 7/28* (2006.01)
*C09D 127/06* (2006.01)

(58) Field of Classification Search
USPC ............... 174/110 F, 120 R, 113 R
See application file for complete search history.

(56) References Cited

U.S. PATENT DOCUMENTS

| | | | | |
|---|---|---|---|---|
| 5,280,137 | A * | 1/1994 | Ward | H01B 7/187 174/110 V |
| 8,723,041 | B2 * | 5/2014 | Frigerio | H01B 3/441 174/110 R |
| 2006/0137894 | A1 | 6/2006 | Cusson et al. | |
| 2008/0161435 | A1 * | 7/2008 | Venkataraman | C08J 9/0066 521/79 |
| 2008/0296041 | A1 * | 12/2008 | Fukuchi | H01B 3/441 174/110 R |
| 2009/0233052 | A1 * | 9/2009 | Thuot | H01B 7/0233 428/159 |
| 2013/0233589 | A1 * | 9/2013 | Kaga | H01B 13/06 174/113 R |

FOREIGN PATENT DOCUMENTS

| | | |
|---|---|---|
| CN | 103 578 610 A | 2/2014 |
| CN | 104 672 691 A | 6/2015 |
| DE | 26 26 497 A1 | 12/1977 |
| DE | 31 05 228 A1 | 9/1982 |
| DE | 195 24 526 A1 | 1/1996 |
| EP | 1 582 545 A1 | 10/2005 |
| GB | 2 331 864 A | 6/1999 |
| JP | 2003 064232 A | 5/2003 |
| KR | 2014 0083360 A | 7/2014 |
| WO | 03/088274 A1 | 10/2003 |

OTHER PUBLICATIONS

Written Opinion, PCT International Application No. PCT/EP2015/069566 dated Apr. 26, 2016.

* cited by examiner

ELECTRICAL CABLE FOR AN APPLIANCE, APPLIANCE AND METHOD FOR PRODUCING AN ELECTRICAL CABLE

BACKGROUND OF THE INVENTION

The invention concerns an electrical cable for an appliance, such an appliance as well as a method for producing the electrical cable.

Such a cable is regularly used in various appliances, in particular for a vacuum cleaner, such as a floor vacuum cleaner, and in general for electrical appliances demanding a dynamic cable behavior. Such devices might have automatic or manual cable retrieving devices such as exemplarily described in US 2002/0008172 A1. Such a cable retrieving device often comprises a cable drum that allows the user of to store the cable inside the vacuum cleaner, thus avoiding to tangle.

Each storing or revival operation by the users stretches the electrical cable. This repeating tension can lead to various malfunctions in the cable, such as a breaking of the conductors inside the cable structure, which leads to the case where the vacuum cleaner does not receive electrical power and stops working. Also various insulation layers or sheathing layers of the cable can break. Depending on the broken layer, this can lead to short circuits between the conductors or even to potential hazardous situations for the user, if a conductor is not shielded to the outside of the cable. Therefore cables must be able to remain functional even after a high number of bending or flexing cycles in order to be used for vacuum cleaners. Further to this requirement, the variance of the maximum number of jerking or flexing cycles before breakdown of such an electrical cable should be low.

Additionally, cables used for vacuum cleaners should be able to handle multiple cable jerks and should have a high resistance to sharp object impacting the outer sheath, before a breakage of the center conductors of such a cable occurs. Prior art cables regularly suffer breakdown of the center conductor at around 500 cycles in the jerk test and around 150,000 cycles in the flexing test.

SUMMARY OF THE INVENTION

It is thus an object of the invention to improve the cable performance by increasing the average number of cycles before breakdown in the flexing and jerk test.

The problem is solved by an electrical cable with the features of claim 1, by an appliance according to claim 9 and by a method for production of an electrical cable according to claim 10. Further aspects, advantages or alternatives of the invention can be found in the dependent claims.

The electrical cable according to this invention is specifically used for the power connection of various types of appliances, in particular home appliances, e.g. tools, kitchen appliances and in particular vacuum cleaners. In general the term appliance is to be understood as an electrical appliance that is connected to a regular household power outlet, providing e.g. 230 V.

The electrical cable has the advantages of withstanding an increased number of flexing or jerking cycles before a malfunction of the cable, i.e. a break of the outer sheath layer or the center conductor, occurs.

The cable also withstands a jerk test, which tests the cable performance against the impact of a sharp object against the outer periphery of the cable while at the same time providing a longitudinal tear force on the cable. The number of cycles before the break of the center conductor is measured. The cable according to the invention shows a higher number of average cycles in the jerk test before breakdown compared to prior art non foamed cables.

The electrical cable according to this invention comprises a core bundle with at least two core wires. Each of the core wires comprise a center conductor, which is made of a conductive material. Moreover, the center conductor is preferably made of strands from a conductive material, as strands increase the bendability as well as flexibility of a conductor compared to a conductor with the same electrical resistance made from a solid material. The center conductors are preferably made of copper strands, but also other electrically conductive materials are generally suitable. An insulation layer is formed around the center conductors. This insulation layer is arranged on the outer periphery of the center conductor. The insulation material is manufactured from a polyvinyl chloride based compound.

The at least two core wires are preferably twisted around each other to form a twisted core bundle. The twisting of the core wires allows a uniform bending in all directions as in a twisted bundle there is no preferred direction for bending in comparison with e.g. a core bundle made of parallel wires.

The core bundle is preferably used to transmit power from a power outlet to the appliance. The electric cable is thus a power cable, with the two core wires serving as phase and neutral respectively. A third wire may be used as grounding. In a suitable alternative, the core bundle consists of four or five core wires and the cable is in particular a three-phase cable.

An inner sheath layer is arranged to surround the core bundle. Preferably the outer cross section of the sheath layer is circular or oval. In a preferred embodiment, the inner sheath layer encloses the core bundle completely. The core bundle is preferably in the center of the sheath layer, such that the cross section of the cable a nearly or totally symmetrical, e.g. has at least one preferably two axes of symmetry.

The inner sheath layer is manufactured from a foamed and softened polyvinyl chloride compound. A foamed polyvinyl chloride compound is a compound with a decreased density compared to a non-foamed polyvinyl chloride, because a certain fraction of the volume of the foamed compound includes gaseous inclusions or cells. In particular, these cells constitute macroscopic holes in the material and the foamed inner sheath layer thus is a porous structure.

An outer sheath layer surrounds the inner sheath layer. Preferably the outer sheath layer has an outer cross section of circular or oval shape. Preferably the outer sheath layer has a uniform or constant thickness around the cable as well as along the cable. Overall it is preferred that the cross section of the electrical cable has a nearly or totally symmetrical design, which means that the cross section has at least one preferably two axes of symmetry. The outer sheath layer is also referred to as skin or skin layer. The outer sheath layer is manufactured from a non-foamed and preferably softened polyvinyl chloride compound.

The combination of the inner sheath layer and the outer sheath layer is also referred to as sheathing.

A softened polyvinyl chloride compound is preferably obtained by mixing a softener, also called plasticizer, into the polyvinyl chloride compound, i.e. before creating a melt for extrusion. Suitable softeners are for example phthalates, adipates, sebacates, maleates, trimellitates or similar materials. Preferably all parts of the cable fabricated from a polyvinyl chloride compound are fabricated using a softened polyvinyl chloride compound. Thus, it is understood that the term polyvinyl chloride in particular means a softened polyvinyl chloride compound.

External forces applied to a sheath layer made of a non-foamed polyvinyl chloride compound are advantageously distributed over a larger area. Such external forces may e.g. arise in cases where the cable gets into contact with a tip or an edge or any other sharp body. The non-foamed compound also inhibits any penetration of such a sharp body into the cable, as the polyvinyl chloride has a high tensile strength. This behavior can be tested with an impact test.

The cells or gaseous inclusions of the foamed inner sheath layer have the effect that the mechanical properties of this inner sheath layer are improved. Upon bending or flexing of the cable, the bending or flexing energy is in particular absorbed by these gaseous inclusions. Thereby the overall stress on the polyvinyl chloride material is reduced significantly. This behavior can be tested with a flexing and bending test.

A particular advantage consist in the combination of the highly flexible foamed inner sheath layer and the tensile non-foamed outer sheath layer, as forces acting on the outer sheath layer are distributed within a large area or volume of the outer sheath layer and thus also the inner sheath layer. This distribution in turn leads to a lower peak value of any remaining forces, i.e. a lower local force at a particular point in the cable, thereby reducing the stress on the polyvinyl chloride compounds.

Although the cells of the inner sheath layer can be of arbitrary form, it is preferred that their geometric shape is at least approximately a sphere or ellipsoid and in general round. For any form, the volume of the cells can be measured by comparing the volume of a cell to a corresponding sphere with the same volume and a certain diameter. In this way each cell can be assigned an equivalent diameter, i.e. the diameter of a spherical cell having the same volume as the possibly non-spherical cell in question. Alternatively, a cell's equivalent diameter is defined as the diameter of a circle with the same area as the cell in a cross-sectional view of the cable.

It was found that a specific good result for the jerk and flexing properties was obtained in the case of a specific cell size range. In general, the volume, area and equivalent diameters of all cells each form a distribution having an average value. Thus, the cells form an ensemble of cells characterized by an average equivalent diameter or mean diameter of the distribution of equivalent diameters. In a preferred embodiment, this average equivalent diameter is between 110 and 200 micrometers, preferably between 120 and 150 micrometers.

Also the cell size is preferably below a maximum cell size, i.e. a given cell's equivalent diameter does not exceed a maximum equivalent diameter. In a preferred embodiment, each cell's equivalent diameter is smaller than 250 micrometers, preferably smaller than 200 micrometers and in particular larger than 1 micrometer, preferably larger than 2 micrometers, even more preferably larger than 10 micrometers.

The outer sheath preferably has a minimum thickness larger than the average equivalent diameter, preferably the minimum thickness is larger than 120 micrometers and smaller than 300 micrometers. Such a minimum outer sheath thickness was found to sufficiently cover the cells so that the cellular structure of the inner skin is not visible on the outside of the electrical cable.

The outer sheath layer has an average thickness which is preferably at least equal to the maximum cell size, i.e. equivalent diameter and not exceeding twice the maximum cell size, i.e. twice the equivalent diameter. Preferably the average thickness lies in the range of 100 micrometers to 800 micrometers.

In a preferred embodiment, the equivalent diameter of cells located at an outer location of the inner sheath layer, i.e. at a radial outer position, is larger than the equivalent diameter of cells located at an inner location of the inner sheath layer, i.e. a radial inner position. In this case the average cell volume of cells increases with increasing distance from the core bundle. In this way, the cells are generally larger on the outside of the inner sheath layer than on the inside.

The density of the inner sheath is reduced by using the foamed polyvinyl chloride as opposed to a non-foamed polyvinyl chloride as used in prior art cables. The density of the cable is an indicator on the overall amount of cells present in the inner sheath. While control of the cell size is important to obtain uniform material properties and a high resistance to smaller sharp objects, the control of the overall density or in other words the relative volume share of cells compared to the volume of the polyvinyl chloride is important for the overall bending and flexing properties.

The inner sheath layer and the outer sheath layer combined have a preferred density in the range of 1.1 $g/cm^3$ and 1.35 $g/cm^3$. For lower densities the cable was found to lack sufficient mechanical strength as the remaining volume of polyvinyl chloride was too small. Higher densities than the given range showed similar effects as cables without a foamed layer, as for densities above the preferred range, large clusters of solid polyvinyl chloride are observed that behave like solid material. In both cases the results of the flexing and bending test for such cables showed a reduced number of cycles before breakdown.

Generally, it is preferred that the overall density of the combined inner and outer sheath layers is between 2 to 15% lower than the density of a combined non-foamed inner sheath layer and outer sheath layer from a cable according to the prior art, i.e. with non-foamed inner and outer sheath layers. Thereby a sandwich form is achieved with a high density and high tensile strength insulator layer, a flexible inner sheath layer and another high density and high tensile strength outer sheath layer, leading to a very durable cable design.

The method of manufacturing an electrical cable for an appliance, in particular a vacuum cleaner comprises the following steps:

A core bundle comprising two core wires is passed through an extrusion head connected to a first and a second extruder. The core bundle is processed with an extrusion velocity v, i.e. moved at a velocity v with respect to the extrusion head. Each of the two core wires comprises a center conductor made of conductive strands and an insulation layer on the outer periphery of the center conductor, the insulation layer comprising a non-foamed softened polyvinyl chloride compound. An inner sheath layer is applied, i.e. extruded onto the core bundle inside a first part of the extrusion head which is connected to the first extruder and an outer sheath layer is applied in a second part of the extrusion head which is connected to a second extruder. This allows a co-extrusion of the outer and inner sheath layer. Preferably a co-extrusion head is used as extrusion head. Due to the proximity of the first part and the second part of the extrusion head the inner sheath layer and the outer sheath layer are bonded together, especially since both layers are manufactured from similar materials.

Thus the application of the inner sheath layer by the first part of the extrusion head and of the outer sheath layer by the second part of the extrusion head is done consecutively, such that the inner sheath layer is arranged around the insulation layers of the core bundle and the outer sheath layer is arranged around the inner sheath layer.

The inner sheath layer comprises a foamed softened polyvinyl chloride compound, and the outer sheath layer comprises a non-foamed, softened polyvinyl chloride compound. The outer sheath is applied on the still soft inner sheath layer in order to arrange perfect adhesion.

The foamed softened polyvinyl chloride compound is extruded from the first extruder and applied through the first part of the—extrusion head by providing a mixture of polyvinyl chloride material and a chemical blowing agent to the first extruder, i.e. the first extruded is loaded with a mixture of polyvinyl chloride compound and chemical blowing agent. Preferably the polyvinyl chloride material is provided to the first extruder in the form of granules. The chemical blowing agent in turn is preferably also provided as a solid material, in particular as granules, i.e. in granular form.

The chemical blowing agent contains an active agent which is activated during the extrusion and reacts by generating or releasing gaseous products. These gaseous products then form cells inside the extruded polyvinyl chloride compound and create a porous structure, namely foamed polyvinyl chloride.

In a preferred embodiment, the active agent is activated by heat during extrusion of the polyvinyl chloride compound mixed with the chemical blowing agent. Upon heating, the active component decomposes and generates or releases gaseous products. These products then form cells inside the extruded polyvinyl chloride compound. Thus, a porous structure is formed, namely foamed polyvinyl chloride.

In one embodiment, the chemical blowing agent contains further material in addition to the active agent, e.g. an inert filling material. Preferably the active component of the chemical blowing agent is provided to the first extruder at a concentration of less than 0.8 wt. %, more preferably in the range of 0.1 wt. % to 0.3 wt. %, with respect to the polyvinyl chloride material in the first extruder. In particular, the first extruder is loaded with a mixture of a polyvinyl chloride compound as polyvinyl chloride material and the chemical blowing agent, comprising an active component.

The active component of the chemical blowing agent preferably is azodicarbonamide.

The extrusion head is heated to a specific temperature to facilitate extrusion of the material from the extruders. For the application of a foamed softened polyvinyl chloride compound as the inner sheath layer and the application of the non-foamed softened polyvinyl chloride compound as the outer sheath layer, the preferred temperature at the first and second part of the—extrusion head is in the range of 130 to 150° C. Also the extruders are each heated to a specific extruder temperature. In addition, each extruder is divided in a number of zones along an axis. It is advantageous that each extruder is heated homogeneously along the axis so that the material in the extruder is uniformly heated. Preferably the maximum temperature in any of the zones of the first extruder is lower than 150° C. It was found that above this temperature the cell size drastically increases and neighboring cells start to coalesce. This leads to a reduced mechanical stability of the cable and a poor performance of the cable in an impact and jerk test. The effect of coalescing cells also depends on the viscosity and thus the temperature of the polyvinyl chloride compound. Polyvinyl chloride is usually hard to extrude at lower temperatures due to its high viscosity in this case. Extrusion of polyvinyl chloride at too low temperatures leads to a high surface roughness of the cable, thus a matte appearance is found due to changes on the surface microstructure. Such cables usually show a wider spread in breakdown cycles in the bending and flexing tests, i.e. their breaking is less predictable. By applying above mentioned temperatures an optimal cell size is achieved and a suitable viscosity of the polyvinyl chloride compound during the extrusion is assured.

The extrusion velocity is preferably in the range of 80 to 140 m/min. This has shown especially good results when using the chemical blowing agent comprising azodicarbonite as the active component, and a concentration of the chemical blowing agent below 0.8 wt. % with respect to the polyvinyl chloride material It was found that the cable according to the invention has a good stripping force stemming from a certain bonding between the insulation layers of the core wires and the inner sheath layer. This bonding does not measurably increase the bending or flexing properties of the cable design. Therefore, to ease installation, the stripping force is preferably lowered by depositing a separating powder to the insulation layers of the core wires. Suitable separating powders are calcium stearate, lithium stearate or talcum powder.

The cable is preferably cooled immediately after leaving the extrusion head. To achieve this the core bundle with the applied inner sheath layer and outer sheath layer is in a suitable embodiment guided through cooling means after leaving the extrusion head. The cooling means can be an immersion bath filled with a coolant, such as water, or a shower or sprinkler system. The cooling means are preferably placed close to the extrusion heads to ensure an optimal structural integrity of the whole cable. Reliable bending and flexing results were achieved in cases in which a travelling time for a specific section of the core bundle leaving the extrusion head and subsequently entering the cooling means is small, preferably less than 1 second.

EMBODIMENTS OF THE INVENTION

Embodiments of the invention are explained using the following figures.

Figure 1:
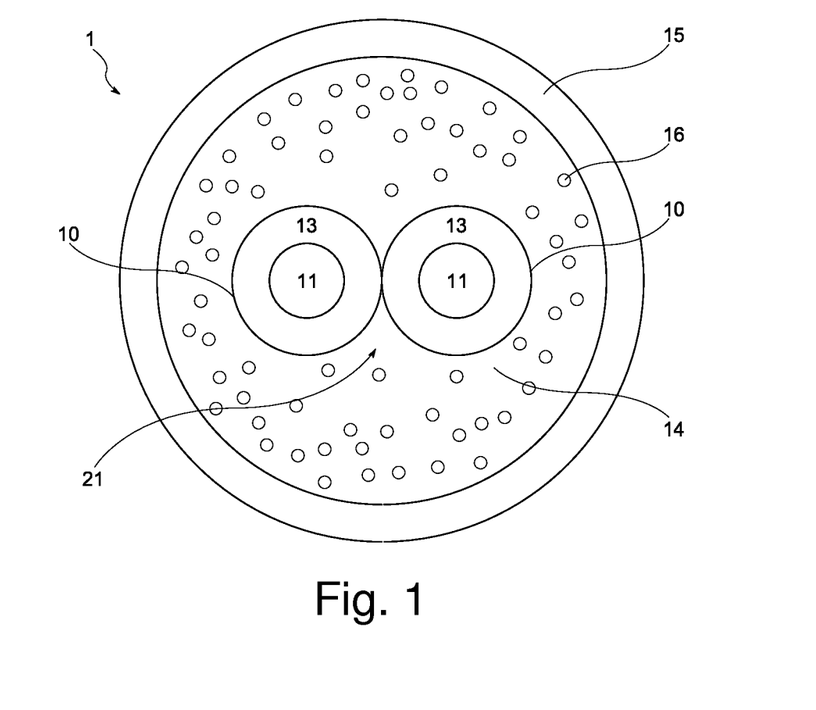
FIG. 1 shows an electrical cable according to the invention.

FIG. 1 shows a cross-sectional view of an electrical cable 1 used as power cord for an appliance. The cable 1 comprises a core bundle 21 comprising two core wires 10, each of the two core wires 10 comprising a center conductor 11 made of a number of conductive strands 12, which are not shown in detail, and an insulation layer 13 on the outer periphery of the center conductor 11, the insulation layer 13 comprising a non-foamed softened polyvinyl chloride compound. The cable 1 further comprises an inner sheath layer 14 arranged around the insulation layers 13, the inner sheath layer 14 comprising a foamed softened polyvinyl chloride compound which contains a plurality of cells 16 and wherein each cell 16 is characterized by an equivalent diameter, in particular the diameter of a sphere having the same volume as the cell 16, and an outer sheath layer 15 arranged around the inner sheath layer 14, the outer sheath layer 15 comprising a non-foamed, softened polyvinyl chloride compound. The outer sheath layer 15 is also referred to as skin.

Figure 2:
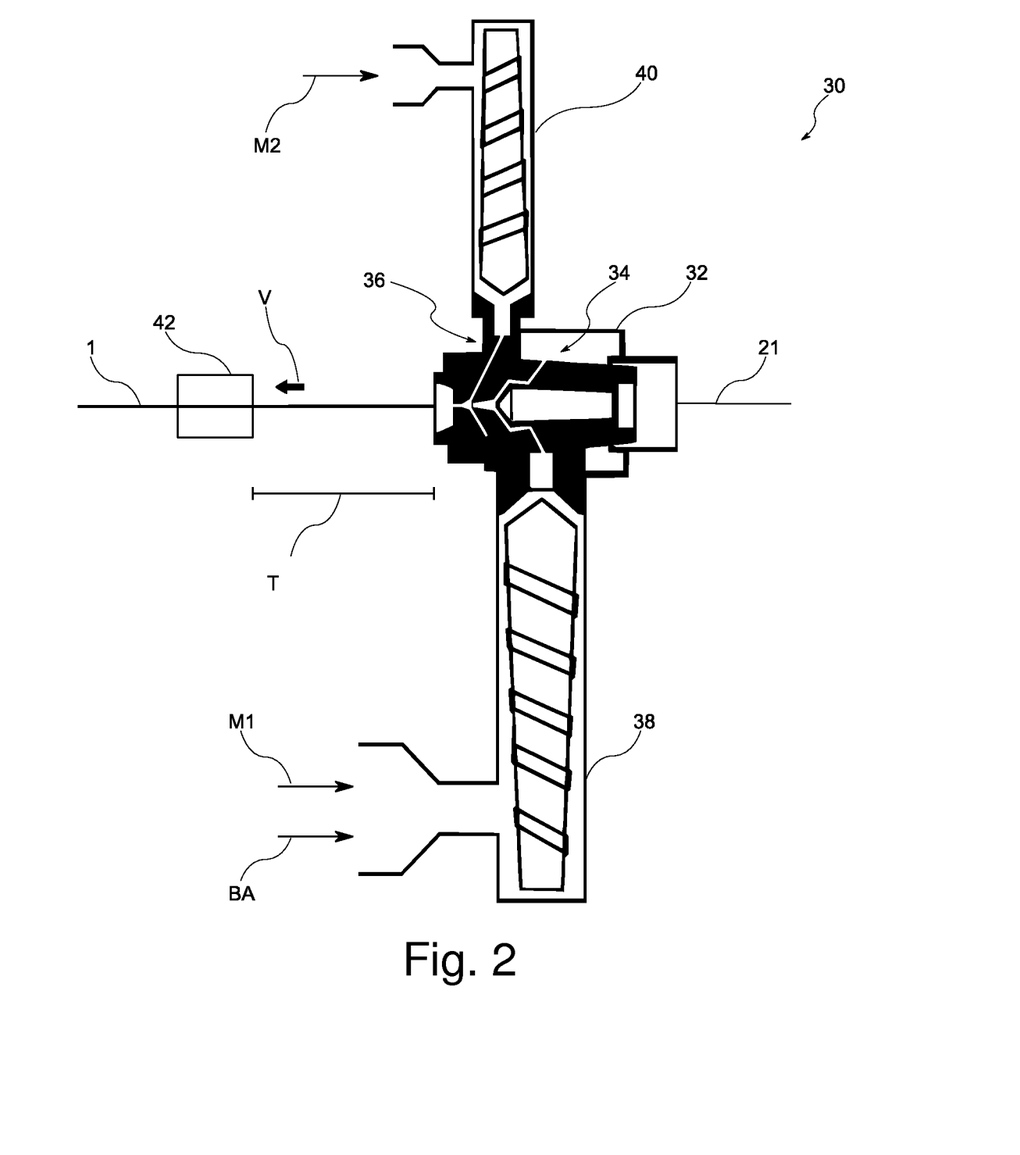
FIG. 2 shows a setup for the production of an electrical cable according to the invention.

FIG. 2 shows a setup 30 for manufacturing of the cable 1. The setup 30 comprises an extrusion head 32 which is a co-extrusion head with a first part 34 for extrusion of the inner sheath layer 14 and a second part 36 for extrusion of the outer sheath layer 15. Each of the parts 34, 36 is connected to an extruder, namely a first extruder 38 and a second extruder 40. The first extruder 38 is loaded with a combination of a first material M1, which here is a polyvinyl chloride compound, and a chemical blowing agent BA, which comprises an active component to generate the cells 16 inside the inner sheath layer 14. The second extruder 40 is loaded with a second material M2, which here also is a polyvinyl chloride compound. Both extruders 38, 40 are heated to a temperature in the range of 120 to 150° C.

For production of the electric cable 1, a core bundle 21 is fed to the extrusion head 32 and processed, i.e. moved with a certain extrusion velocity V. Both materials M1, M2 are then subsequently applied onto the core bundle 21. More specifically, the first material M1 is applied in the first part 34 of the extrusion head 32 and directly onto the core bundle 21. In an alternate embodiment, a separating powder is applied onto the core bundle 21 prior to feeding it to the extrusion head 32. Directly after applying the first material M1 to form the inner sheath layer 14, the second material M2 is applied onto this inner sheath layer 14 and forms the outer sheath layer 15.

Upon exiting the extrusion head 32 the cable travels towards cooling means 42, which here comprise a water bath at a low temperature, e.g. around 17° C. The cooling means 42 are placed a certain distance away from the extrusion head 32, whereby the distance corresponds to a travelling time T which a given section of the cable 1 needs for travelling from the extrusion head 32 to the cooling means 42. The travelling time T is preferably less than 1 second.

Figure 3A:
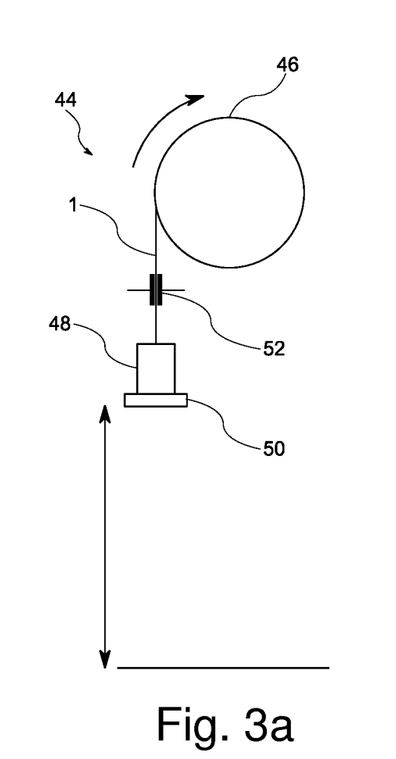
FIG. 3 shows a typical jerk test setup for testing a cable's impact resistance.
Figure 3B:
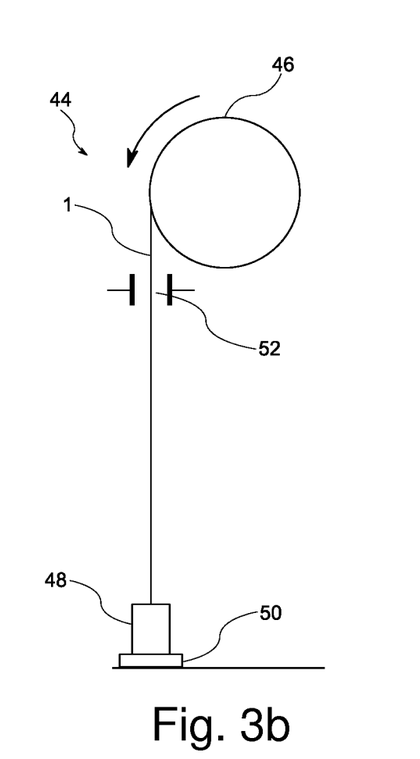

A jerk test is carried out on a machine 44 as shown in FIGS. 3a and 3b. The machine 44 comprises a cord winder 46, e.g. a vacuum cleaner drum on which a tested cable 1 is wound up. The length of the tested cable 1 is preferably around 2 m. The machine 44 works in cycles as illustrated by the two FIGS. 3a and 3b. One cycle starts with winding up the cable 1 into the drum by a pneumatic engine, which is not shown, while a weight 48 of 1 kg is attached to the cable 1. A flatbed 50 supports lifting the weight 48 during the last third of a drop length. Upon release of the pneumatic force the weight 48 drops from a distance of about 0.3 m such that the cable 1 is fully unwound from the cord winder 46 and the weight 48 creates a potentially damaging load acting on a section of the cable 1 which is in contact with a sharp edge 52 of the drum body 46. Electrical current is applied to the cable 1 and monitored in order to detect breaking of the centre conductors 11.

Figure 4:
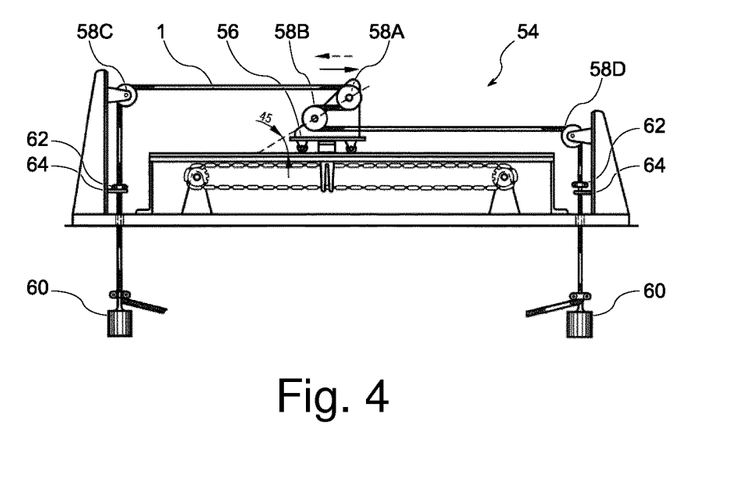
FIG. 4 shows a typical test setup for testing a cable's bending and flexing properties.

A flexing test for the cable 1 is carried out by means of the apparatus 54 shown in FIG. 4. This apparatus 54 consists of a carrier 56, a driving system for the carrier 56 and four pulley wheels 58A, 58B, 58C, 58D for each cable 1 to be tested. The carrier 56 supports two pulley wheels 58A, 58B which are of the same diameter. The remaining two pulley wheels 58C, 58D are fixed at the ends of the apparatus 54 may be of a different diameter than the pulley wheels 58A, 58B, but all four pulley wheels 58A, 58B, 58C, 58D are arranged in a way that the cable 1 is horizontal between them. The carrier 56 performs cycles of forward and backward motion over a distance of about 1 m at an approximately constant speed of 0.33 m/s between each reversal of the direction of movement.

Furthermore, weights 60 are attached to the cable 1. These weights 60 stretch the cable 1 along the path between the pulley wheels 58A, 58B, 58C, 58D. To prevent the cable 1 from slipping out of the apparatus 54 an number of restraining clamps 62 is attached to the cable and limits a slipping movement and by being restrained by corresponding supports 64 of the apparatus 54. The distance from one of the restraining clamps 62 to its support 64 is at most 50 mm. The other clamp 62 is resting on its support 64.

A current is applied to the cable 1. The electrical current, the weights and the pulley diameters are chosen with respect to the specific cable 1 construction. For a two-core cable 1 with a copper cross-section of 2 times 0.75 $mm^2$ the following values are used: a current of 3 A, a weight with a mass of 1 kg and pulley diameters of 80 mm. A total of 30,000 bending cycles is required to pass this test.

It has been observed that prior art non-foamed cables typically can perform an average of 150,000 bending cycles until cracks on the sheathing appear while a cable 1 with a foamed inner sheath layer can be subject to 170,000 bending cycles, which is an improvement of around 13%.

Figure 5:
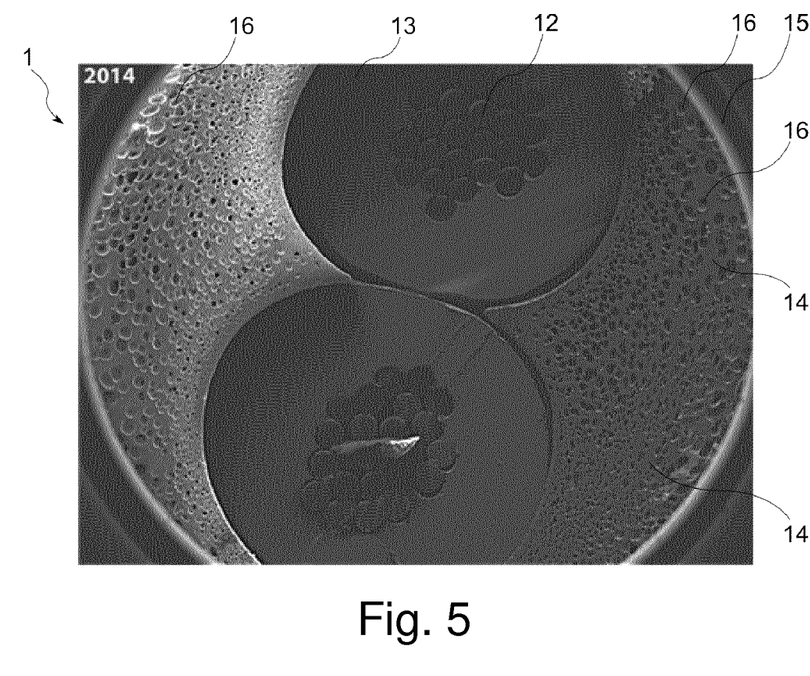
FIG. 5 shows an SEM image of cells comprised in an inner sheath layer of an electrical cable according to the invention.

FIG. 5 shows an SEM image from a cross-sectional area of a cable 1. Clearly visible is the inner sheath layer 14 comprising a plurality of cells 16 of various sizes. Also visible are the outer sheath layer 15 as well as the core bundle 21 which comprises two centre conductors 11, each in turn comprising a number of conductive strands 12 surrounded by an insulation layer 13. Particularly visible is the variation in the cells' 16 size. Starting from the centre, i.e. the location of the core bundle 21, the cells' 16 diameter increases towards the outer sections of the inner sheath layer 14.

A reference sample cable and a number of cables according to the invention were manufactured and subsequently tested with respect to their elongation and their tensile strength at break. The various cables were manufactured varying the extrusion velocity and the composition of the inner sheath layer.

REFERENCE EXAMPLE

A prior art non-foamed reference cable was manufactured with an extrusion velocity of v=160 m/min. The concentration of the chemical blowing agent was 0 wt. % to create a non-foamed inner sheath layer. The elongation at break of the sheathing was 322%, tensile strength at break 18 MPa and the density of the combined inner and outer sheath layer, i.e. the overall sheathing, was 1.38 $g/cm^3$. The cable surface had a smooth appearance without any defects.

In the following examples a chemical blowing agent with azodicarbonamide, abbreviated ADCA, as active component was added in various concentrations to the polyvinyl chloride compound for the inner sheath layer to create a foamed inner sheath layer.

First Example

A cable with a foamed inner sheath layer was manufactured with an extrusion velocity of V=120 m/min. The concentration of the active component was 0.25 wt. %. The elongation at break of the sheath was 250%, tensile strength at break was 14.5 MPa and the density of the overall sheathing was 1.27 $g/cm^3$. The cell size was from the range 150 to 170 μm and the minimum skin thickness was 245 μm. The resultant cable surface had a smooth appearance without any defects.

Second Example

A cable with foamed inner sheath layer was manufactured with an extrusion velocity of V=120 m/min. The concentration of the active component was 0.15 wt. %. The elongation at break of the sheath was 249%, tensile strength at break was 14.7 MPa and the density of the overall sheathing was 1.26 g/cm³. The size of the cells in the inner sheath layer was in the range of 140 to 150 μm and the minimum thickness of the outer sheath layer, i.e. the skin was 228 μm. The resultant cable surface had a smooth appearance without any defects.

Third Example

A cable with foamed inner sheath layer was manufactured with an extrusion velocity of V=120 m/min. The concentration of the active component was 0.23 wt. %. The elongation at break of the sheath was 263%, tensile strength at break was 15.1 MPa and the density of the overall sheathing was 1.21 g/cm³. The size of the cells in the inner sheath layer was in the range of 120 to 200 μm and the minimum skin thickness was 228 μm. The resultant cable surface had a smooth appearance without any defects.

Fourth Example

A cable with foamed inner sheath layer was manufactured with an extrusion velocity of V=120 m/min. The concentration of the active component was 0.24 wt. %. The elongation at break of the sheath was 218%, tensile strength at break was 13.5 MPa and the density of the overall sheathing was 1.28 g/cm³. The size of the cells in the inner sheath layer was in the range of 140 to 200 μm and the minimum skin thickness was 266 μm. The resultant cable surface had a smooth appearance without any defects.

Fifth Example

A cable with foamed inner sheath layer was manufactured with an extrusion velocity of V=120 m/min. The concentration of the active component was 0.09 wt. %. The elongation at break of the sheath was 282%, tensile strength at break was 16 MPa and the density of the overall sheathing was 1.28 g/cm³. The size of the cells in the inner sheath layer was in the range of 140 to 160 μm and the minimum skin thickness was 114 μm. The resultant cable surface had a smooth appearance without any defects.

The following table 1 summarizes the production parameters and test results for the above described cable samples:

TABLE 1

| Parameter | Unit | Reference | $1^{st}$ example | $2^{nd}$ example | $3^{rd}$ example | $4^{th}$ example | $5^{th}$ example |
|---|---|---|---|---|---|---|---|
| Extrusion velocity | [m/min] | 160 | 120 | 120 | 120 | 120 | 120 |
| Elongation at break | [%] | 322 | 250 | 249 | 263 | 218 | 282 |
| Tensile strength at break | [MPa] | 18 | 14.5 | 14.7 | 15.1 | 13.5 | 16.0 |
| Active component concentration | [wt. %] | 0 | 0.25 | 0.15 | 0.23 | 0.24 | 0.09 |
| Density of overall sheathing | [g/cm³] | 1.38 | 1.27 | 1.26 | 1.21 | 1.28 | 1.35 |
| Mean cell size, i.e. diameter | [μm] | 0 | 150 | 140 | 120 | 140 | 140 |
| Maximum cell size, i.e. diameter | [μm] | 0 | 170 | 150 | 200 | 200 | 160 |
| Minimum thickness of outer sheath layer | [μm] | N/A | 245 | 228 | 228 | 266 | 144 |

It can readily be seen that all five example cables fulfill the mechanical requirements according to EN 50525-2-11, namely a tensile strength at break of at least 10 MPa and an elongation at break of at least 150%.

Furthermore, an impact and jerking test as described above was conducted. For this test, two samples were fabricated, one standard sample with a non-foamed inner and outer sheath layer, and one sample with the novel foamed structure according to the instant application. The impact and jerking test was conducted on ten different section along each sample cable and the number of cycles until breaking of the sample was recorded.

The results are shown in the following table 2, in which the first column indicates the number of the test run, the second column shows the number of cycles until breaking of the standard cable in each single test run and the third column shows the number of cycles until breaking of the cable with the novel structure in each single test run. The average number of cycles until breaking for the standard cable is 514 with a standard deviation of 126.1 and the number of cycles until break for the novel cable is 686 with a standard deviation of 126.1. It can readily be appreciated that the novel foamed cable structure is more robust.

TABLE 2

| Test run number | Number of cycles until breaking of standard cable | Number of cycles until breaking of novel cable |
|---|---|---|
| 1 | 409 | 569 |
| 2 | 345 | 910 |
| 3 | 483 | 440 |
| 4 | 438 | 646 |
| 5 | 466 | 870 |
| 6 | 695 | 868 |
| 7 | 621 | 699 |
| 8 | 457 | 670 |
| 9 | 497 | 699 |
| 10 | 730 | 489 |

REFERENCES

1 Electrical cable
10 core wire
11 center conductor
12 conductive strand
13 insulation layer
14 inner sheath layer
15 outer sheath layer, skin
16 cell
21 core bundle
30 setup
32 extrusion head
34 first part of extrusion head
36 second part of extrusion head
38 first extruder
40 second extruder
42 cooling means
44 machine for jerk test
46 cord winder
48 weight
50 flatbed support
52 sharp edge
54 apparatus
56 carrier
58A, 58B,
58C, 58D pulley wheel
60 weight
62 restraining clamp
64 support
BA chemical blowing agent
M1, M2 material
T travelling time
V extrusion velocity

The invention claimed is:

1. An electrical cable (1) for an appliance comprising
a core bundle (21) comprising two core wires (10), each of the two core wires (10) comprising a center conductor (11) made of conductive strands and an insulation layer (13) on the outer periphery of the center conductor (11), the insulation layer (13) comprising a non-foamed softened polyvinyl chloride compound,
an inner sheath layer (14) arranged around the insulation layers (13), the inner sheath layer (14) comprising a foamed softened polyvinyl chloride compound,
wherein the foamed softened polyvinyl chloride compound of the inner sheath layer (14) contains a plurality of cells (16) consisting of gaseous inclusions in the polyvinyl chloride compound, and wherein each cell (16) is characterized by an equivalent diameter, wherein the equivalent diameters of the plurality of cells (16) form a distribution of equivalent diameters, the distribution having an average equivalent diameter, wherein the equivalent diameter of the cells located at an outer location of the inner sheath layer (14) is larger than the equivalent diameter of cells located at an inner location of the inner sheath layer (14), and
an outer sheath layer (15) arranged around the inner sheath layer (14), the outer sheath layer (15) comprising a non-foamed, softened polyvinyl chloride compound and having a minimum thickness larger than the average equivalent diameter, and a maximum thickness of twice a maximum equivalent diameter of the plurality of cells (16).

2. The electrical cable (1) according to claim 1, wherein the average equivalent diameter is in the range of 110 to 200 micrometers.

3. The electrical cable (1) according to claim 1, wherein the equivalent diameters are smaller than 250 micrometers.

4. The electrical cable (1) according to claim 1, wherein the outer sheath layer (15) has a minimum thickness between 120 micrometers and 300 micrometers.

5. The electrical cable (1) according to claim 1, wherein the outer sheath layer (15) has an average thickness which is at least equal to a maximum equivalent diameter of the cells.

6. The electrical cable (1) according to claim 1, wherein the combined inner sheath layer (14) and outer sheath layer (15) have an overall density that is between 2% to 15% lower than a density of a combined non-foamed inner sheath layer and outer sheath layer.

7. The electrical cable (1) according to claim 1, wherein the inner sheath layer (14) and the outer sheath layer (15) combined have an overall density between 1.1 g/cm3 and 1.35 g/cm3.

8. An appliance with an electrical cable (1) according to claim 1, wherein the electrical cable (1) is used as a power cord.

9. The appliance according to claim 8, wherein the appliance is a vacuum cleaner.

10. The electrical cable according to claim 1, wherein the appliance is a vacuum cleaner.

11. The electrical cable (1) according to claim 1, wherein each cell (16) in the foamed softened polyvinyl chloride compound of the inner sheath layer (14) has an equivalent volume.

* * * * *